United States Patent
De Luca (10) Patent No.: US 10,203,108 B2
(45) Date of Patent: Feb. 12, 2019

(54) VAPOR GENERATOR INCLUDING WIRE MESH HEATING ELEMENT

(71) Applicant: De Luca Oven Technologies, LLC, San Francisco, CA (US)

(72) Inventor: Nicholas P. De Luca, Carmel-by-the-Sea, CA (US)

(73) Assignee: De Luca Oven Technologies, LLC, San Francisco, CA (US)

( * ) Notice: Subject to any disclaimer, the term of this patent is extended or adjusted under 35 U.S.C. 154(b) by 1160 days.

(21) Appl. No.: 14/459,978

(22) Filed: Aug. 14, 2014

(65) Prior Publication Data
US 2016/0047553 A1     Feb. 18, 2016

(51) Int. Cl.
| | |
|---|---|
| *B01D 3/06* | (2006.01) |
| *F22B 1/28* | (2006.01) |
| *H05B 3/34* | (2006.01) |
| *A47J 27/04* | (2006.01) |
| *F22B 27/16* | (2006.01) |

(52) U.S. Cl.
CPC ............. *F22B 1/287* (2013.01); *A47J 27/04* (2013.01); *F22B 1/288* (2013.01); *F22B 27/16* (2013.01); *H05B 3/34* (2013.01)

(58) Field of Classification Search
None
See application file for complete search history.

(56) References Cited

U.S. PATENT DOCUMENTS

| | | | | |
|---|---|---|---|---|
| 2,490,547 | A * | 12/1949 | Schraner | F22B 1/287 |
| | | | | 122/40 |
| 2,505,656 | A * | 4/1950 | Wagner | F22B 1/287 |
| | | | | 392/399 |
| 3,949,743 | A | 4/1976 | Shanbrom | |
| 4,415,797 | A * | 11/1983 | Choustoulakis | A01M 1/2038 |
| | | | | 222/644 |
| 4,581,522 | A * | 4/1986 | Graham | F24D 19/1096 |
| | | | | 219/213 |
| 5,408,574 | A | 4/1995 | Deevi et al. | |
| 5,711,816 | A * | 1/1998 | Kirlin | C23C 16/18 |
| | | | | 118/726 |
| 5,887,117 | A * | 3/1999 | Desu | B01D 1/0082 |
| | | | | 392/386 |
| 5,909,533 | A | 6/1999 | Kitabayashi et al. | |

(Continued)

FOREIGN PATENT DOCUMENTS

| | | |
|---|---|---|
| CN | 2337903 | 9/1999 |
| EP | 1274281 A2 | 1/2003 |

(Continued)

OTHER PUBLICATIONS

International Search Report for corresponding WO application PCT/US14/51116.

*Primary Examiner* — Joseph M Pelham
(74) *Attorney, Agent, or Firm* — Capitol City TechLaw, PLLC; Jasbir Singh (57) ABSTRACT

There is provided a vapor generator including: a circuit to carry a DC current from an energy device; a wire mesh heating element to receive the DC current; and a sprayer to direct a fine spray of a liquid at the wire mesh heating element to vaporize the liquid, wherein a ratio of a resistance of the wire mesh heating element to a radiative black body area of the wire mesh heating element is less than 2 ohms/m².

25 Claims, 6 Drawing Sheets

(56) References Cited

U.S. PATENT DOCUMENTS

| | | |
|---|---|---|
| 5,958,271 A | 9/1999 | Westerberg et al. |
| 6,069,345 A | 5/2000 | Westerberg |
| 6,114,666 A | 9/2000 | Best |
| 6,146,677 A | 11/2000 | Moreth |
| 6,181,874 B1 * | 1/2001 | Ireland .................... F24H 1/103 392/398 |
| 6,348,676 B2 | 2/2002 | Kim et al. |
| 6,369,360 B1 | 4/2002 | Cook |
| 6,417,494 B1 | 7/2002 | Westerberg et al. |
| 6,575,154 B1 | 6/2003 | Freeman et al. |
| 6,867,392 B1 | 3/2005 | Howard |
| 6,946,631 B2 | 9/2005 | Braunisch et al. |
| 7,091,452 B2 | 8/2006 | Kingdon et al. |
| 7,105,779 B2 | 9/2006 | Shei |
| 7,129,449 B2 | 10/2006 | Tominaga et al. |
| 7,167,776 B2 * | 1/2007 | Maharajh ................. F22B 1/28 219/483 |
| 7,196,291 B2 | 3/2007 | Cothran |
| 7,231,871 B1 | 6/2007 | Wilbers |
| 7,297,903 B1 | 11/2007 | March et al. |
| 7,307,243 B2 | 12/2007 | Farkas et al. |
| 7,335,858 B2 | 2/2008 | Cavada et al. |
| 7,424,848 B2 | 9/2008 | Jones et al. |
| 7,619,186 B2 | 11/2009 | Cavada et al. |
| 7,717,704 B2 | 5/2010 | Burtea et al. |
| 7,726,967 B2 | 6/2010 | Best |
| 7,800,023 B2 | 9/2010 | Burtea et al. |
| 7,851,727 B2 | 12/2010 | Burtea et al. |
| 7,886,658 B2 | 2/2011 | McFadden et al. |
| 7,918,109 B2 * | 4/2011 | Pinkowski ............ D06F 39/008 392/397 |
| 8,033,213 B2 | 10/2011 | Cook et al. |
| 8,145,548 B2 * | 3/2012 | De Luca ................. G06Q 30/04 219/391 |
| 8,272,320 B2 | 9/2012 | Baker et al. |
| 8,350,197 B2 | 1/2013 | Tominaga et al. |
| 8,488,952 B2 * | 7/2013 | Landry .................... A61L 9/03 128/203.27 |
| 8,498,526 B2 | 7/2013 | De Luca |
| 8,522,675 B2 | 9/2013 | Veltrop |
| 8,563,900 B2 | 10/2013 | Han |
| 8,637,792 B2 | 1/2014 | Agnello et al. |
| 8,770,181 B2 | 7/2014 | Best |
| 8,929,724 B1 | 1/2015 | Mograbi |
| 8,948,579 B2 | 2/2015 | Lee |
| 8,991,386 B2 | 3/2015 | Ahmed |
| 8,993,026 B2 | 3/2015 | Molnar et al. |
| 9,089,241 B2 | 7/2015 | Loucha |
| 9,161,547 B2 | 10/2015 | McKee |
| 9,332,877 B2 | 5/2016 | Cochran et al. |
| 9,414,443 B2 | 8/2016 | Fujinami et al. |
| 9,414,707 B2 | 8/2016 | Coleman |
| 2003/0108343 A1 | 6/2003 | Buzzi |
| 2004/0170405 A1 * | 9/2004 | Sherwood ............ A61M 11/041 392/397 |
| 2006/0188238 A1 * | 8/2006 | Kent ....................... A61L 9/03 392/394 |
| 2006/0222351 A1 | 10/2006 | Cezayirli et al. |
| 2008/0037965 A1 * | 2/2008 | De Luca ............... H05B 3/0076 392/416 |
| 2008/0053383 A1 | 3/2008 | Varacins et al. |
| 2010/0051604 A1 * | 3/2010 | Davidov ............... H05B 1/0294 219/488 |
| 2010/0166397 A1 * | 7/2010 | De Luca ............... H05B 3/0076 392/416 |
| 2010/0242316 A1 | 9/2010 | Wielstra |
| 2011/0210115 A1 | 9/2011 | Lauer |
| 2012/0161747 A1 | 6/2012 | Roux |
| 2012/0294595 A1 | 11/2012 | Veltrop et al. |
| 2013/0081582 A1 | 4/2013 | Varga |
| 2013/0104916 A1 | 5/2013 | Bellinger et al. |
| 2013/0161315 A1 | 6/2013 | Cowan |
| 2014/0080079 A1 | 3/2014 | Luo et al. |
| 2014/0110390 A1 | 4/2014 | Wu et al. |
| 2014/0199446 A1 | 7/2014 | Huegerich |
| 2014/0216434 A1 | 8/2014 | Moreth et al. |
| 2014/0318382 A1 | 10/2014 | Hornbeck et al. |
| 2015/0125136 A1 * | 5/2015 | Sanchez .................. A61L 9/03 392/394 |
| 2015/0230295 A1 | 8/2015 | Morassut et al. |
| 2015/0245623 A1 | 9/2015 | Schjerven et al. |
| 2015/0334775 A1 * | 11/2015 | De Luca ................. A21B 1/22 392/416 |
| 2016/0047570 A1 * | 2/2016 | De Luca .............. A47J 31/542 392/488 |
| 2016/0084495 A1 * | 3/2016 | Stone ..................... F22B 1/288 392/399 |
| 2016/0174768 A1 | 6/2016 | DeVerse |
| 2016/0227964 A1 | 8/2016 | Zutphen et al. |
| 2016/0327278 A1 | 11/2016 | McKee et al. |

FOREIGN PATENT DOCUMENTS

| | | |
|---|---|---|
| EP | 1604547 B1 | 12/2011 |
| EP | 2221782 B1 | 12/2011 |
| EP | 2374385 B1 | 5/2013 |
| JP | H08121701 A | 5/1996 |
| JP | H09126474 A | 5/1997 |
| JP | 2001110555 A | 4/2001 |
| JP | 2003266004 A | 9/2003 |
| JP | 2011509695 A | 3/2011 |
| WO | 2015050329 A1 | 4/2015 |
| WO | 2016114451 A1 | 7/2016 |
| WO | 2016194406 A1 | 12/2016 |
| WO | 2017000303 A1 | 1/2017 |

* cited by examiner

VAPOR GENERATOR INCLUDING WIRE MESH HEATING ELEMENT

The disclosure of U.S. patent application Ser. No. 12/345,939 filed Dec. 30, 2008, and entitled "WIRE MESH THERMAL RADIATIVE ELEMENT AND USE IN A RADIATIVE OVEN" is incorporated in its entirety by reference for all purposes.

BACKGROUND OF THE INVENTION

Field of the Invention

Exemplary embodiments of the present invention relate to a vapor generator that includes a wire mesh heating element.

SUMMARY OF THE INVENTION

According to various embodiments, there is provided a vapor generator including: a circuit to carry a DC current from an energy device; a wire mesh heating element to receive the DC current; and a sprayer to direct a fine spray of a liquid at the wire mesh heating element to vaporize the liquid, wherein a ratio of a resistance of the wire mesh heating element to a radiative black body area of the wire mesh heating element is less than 2 ohms/m$^2$.

According to various embodiments, there is provided a vapor generator including: a circuit configured to carry a DC current; a wire mesh heating element configured to receive the current; and a sprayer configured to direct a fine spray of a liquid at the wire mesh heating element to generate vapor, wherein the wire mesh heating element is capable of reaching about 1400° Kelvin from room temperature in less than 10.3 seconds when the wire mesh heating element is not in touch with a liquid or another heating load.

According to various embodiments, there is provided a vapor generator including: a circuit to carry a DC current; a wire mesh heating element to receive the DC current; a sprayer to direct a fine spray of a liquid at the wire mesh heating element to vaporize the liquid; and a spray receiving surface disposed adjacent to the wire mesh heating element, wherein the wire mesh heating element is disposed between the sprayer and the spray receiving surface.

In exemplary embodiments, the vaporizer can generate vapor without using a sprayer, for example, by channeling water along channels adjacent or on the wire mesh heating element. In exemplary embodiments the water can be pumped into a fiberglass mesh.

According to various embodiments, there is provided a vapor generator kit including: a DC power supply; a wire mesh heating element to receive a DC current from the DC power supply; a sprayer configured to direct a fine spray of a liquid at the wire mesh heating element to vaporize the liquid; and a spray receiving surface to be disposed adjacent to the wire mesh heating element, wherein the wire mesh heating element is to be disposed between the sprayer and the spray receiving surface.

In exemplary embodiments, the spray receiving surface includes fiber glass. In exemplary embodiments, the spray receiving surface is hydrophilic. In exemplary embodiments, the spray receiving surface includes electrical insulation. In exemplary embodiments, an average distance between the wire mesh heating element and the spray receiving surface is 10 mm or less, 5 mm or less, 3 mm or less, 2 mm or less, 1 mm or less, or the like. In exemplary embodiments, one or more of the wire mesh heating element or the spray receiving surface are movable with respect to each other.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE FIGURES

The accompanying drawings, which are included to provide a further understanding of the invention and are incorporated in and constitute a part of this specification, illustrate embodiments of the invention, and together with the description serve to explain the principles of the invention.

The same reference number represents the same element on all drawings. It should be noted that the drawings are not necessarily to scale. The foregoing and other objects, aspects, and advantages are better understood from the following detailed description of an embodiment with reference to the drawings, in which.

DESCRIPTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present.

When considering the use of Nichrome within an oven it is important to consider not only the resistive characteristics but also the black body emission of the element when hot.

With Regard to the General Characterization of Resistive Elements, the resistance is proportional to the length and resistivity, and inversely proportional to the area of the conductor.

$$R = L/A \cdot \rho = L/A \cdot \rho 0(\alpha(T-T0)+1) \quad \text{Eq. 1}$$

where $\rho$ is the resistivity:
$\rho = 1/\sigma$.

L is the length of the conductor, A is its cross-sectional area, T is its temperature, T0 is a reference temperature (usually room temperature), $\rho 0$ is the resistivity at T0, and $\alpha$ is the change in resistivity per unit of temperature as a percentage of $\rho 0$. In the above expression, it is assumed that L and A remain unchanged within the temperature range. Also note that $\rho 0$ and $\alpha$ are constants that depend on the conductor being considered. For Nichrome, $\rho 0$ is the resistivity at 20 degrees C. or $1.10 \times 10-6$ and $\alpha = 0.0004$. From above, the increase in radius of a resistive element by a factor of two will decrease the resistance by a factor of four; the converse is also true.

Regarding the power dissipated from a resistive element, where, I is the current and R is the resistance in ohms, v is the voltage across the element, from Ohm's law it can be seen that, since v=iR, $$P = i2R$$

In the case of an element with a constant voltage electrical source, such as a battery, the current passing through the element is a function of its resistance. Replacing R from above, and using ohms law, $$P = v2/R = v2A/\rho 0L \quad \text{Eq. 2}$$

In the case of a resistive element such as a nichrome wire the heat generated within the element quickly dissipates as radiation cooling the entire element.

Now, Considering the Blackbody Characterization of the Element: Assuming the element behaves as a blackbody, the Stefan-Boltzmann equation characterizes the power dissipated as radiation:

$$W = \sigma \cdot A \cdot T4 \quad \text{Eq. 3}$$

Further, the wavelength $\lambda$, for which the emission intensity is highest, is given by Wien's Law as:

$$\lambda_{max} = b/T \quad \text{Eq. 4}$$

Where,
$\sigma$ is the Stefan-Boltzmann constant of $5.670 \times 10^{-8}$ $W \cdot m^2 \cdot K^{-4}$ and,
b is the Wien's displacement constant of $2.897 \times 10-3$ m·K.

In an application such as a cooking oven, requiring a preferred operating wavelength of 2 microns (2×10 E-6) for maximum efficiency, the temperature of the element based on Wein's Law should approach 1400 degrees K. or 1127 degrees C. From the Stefan-Boltzmann equation, a small oven with two heating sides would have an operating surface area of approximately 4×0.25 m×0.25 m or 0.25 m2. Thus, W should approach 20,000 Watts for the oven.

In the case of creating a safe high power toaster or oven it is necessary for the system to operate at a low voltage of no more than 24 volts. Thus, using Eq. 2 with 20,000 W, the element will have a resistance of approximately 0.041 ohms, if 100% efficient at the operating temperature. Based on Eq. 1, a decrease in operating temperature to room temperature (from 1400 to 293 k) represents an approximate decrease in the resistivity of the element by about 1.44 times, and therefore an element whose resistance at room temperature is 0.0284 ohms is required.

Now, Considering the Relationship of the Resistance of the Element and the Characterization of the Element as a Blackbody:

The ratio of the resistance of the heater to the black body raditive area of the same heater becomes the critical design constraint for the oven; herein termed the De Luca Element Ratio. The ideal oven for foods operating over a 0.25 square meter area at 2 micron wavelength has a De Luca Element Ratio (at room temperature), of 0.1137 ohms/m2 (0.0284 ohms/0.25 m2). The De Luca Element Ratio is dependent solely on the resistance of the material and the radiative surface area but is independent of the voltage the system is operated. In addition, for wire, the length of the wire will not change the ratio.

Table 1 lists the resistance per meter of several common nichrome wire sizes as well as the De Luca Element Ratio for these elements. It is important to note that all these wires have a De Luca Element Ratio far greater than the 0.1137 required for an oven operated at 1400K, 24V, and over 0.25 m2. Clearly the use of a single wire with a voltage placed from end-to-end in order to achieve the power requirement is not feasible.

In contrast, a household pop-toaster, operated at 120V and 1500 W, over a smaller 0.338 m2 area at 500K would require a De Luca Element Ratio of 35.5. Thus a 1 meter nichrome wire of 0.001 m radius with a 120V placed across it would work appropriately.

TABLE 1

| Wire Radius (m) | Cross Sectional Area (m2) | Resistance Per Meter Length (ohms) | Surface Area of 1 meter length (m2) | Weight Per Meter (g) | De Luca Element Ratio (at room temp) | Time To Reach 1400 K At 20 kw (sec) |
|---|---|---|---|---|---|---|
| 0.01 | 3.14E-04 | 0.0034 | 0.0628 | 2637 | 0.1 | 65.4 |
| 0.0015 | 7.06E-06 | 0.15 | 0.00942 | 59.3 | 16.2 | 1.47 |
| 0.001 | 3.14E-06 | 0.30 | .00628 | 26.3 | 47.7 | 0.654 |
| .0005 | 7.85E-07 | 1.38 | .00314 | 6.6 | 438 | 0.163 |
| 0.000191 | 1.139E-07 | 11.60 | 0.00120 | 0.957 | 9670 | 0.024 |
| 0.000127 | 5.064E-08 | 24.61 | 0.00079 | 0.425 | 30856 | 0.010 |
| 0.000022 | 1.551E-09 | 771.21 | 0.000138 | 0.013 | 5580486 | 0.0003 |

Clearly a lower resistance or a higher surface area is required to achieve a De Luca Element Ratio of close to 0.1137.

One way to achieve the De Luca Ratio of 0.1137 would be to use a large element of 2 cm radius. The problem with this relates to the inherent heat capacity of the element. Note from Table 1 that to raise the temperature to 1400K from room temperature would require 65.4 seconds and thus about 0.36 KWH of energy.

This Calculation is Derived from the Equation Relating Heat Energy to Specific Heat Capacity, where the Unit Quantity is in Terms of Mass is:

$$\Delta Q = mc\Delta T$$

where ΔQ is the heat energy put into or taken out of the element (where P×time=ΔQ), m is the mass of the element, c is the specific heat capacity, and ΔT is the temperature differential where the initial temperature is subtracted from the final temperature.

Thus, the time required to heat the element would be extraordinarily long and not achieve the goal of quick cooking times.

Another way for lowering the resistance is to place multiple resistors in parallel. Kirkoff's law's predict the cumulative result of resistors placed in parallel.

$$\frac{1}{R_{total}} = \frac{1}{R_1} + \frac{1}{R_2} + \ldots + \frac{1}{R_n} \qquad \text{Eq. 5}$$

The following Table 2 lists the number of conductors for each of the elements in Table 1, as derived using equation 5, that would need to be placed in parallel in order to achieve a De Luca Element Ratio of 0.1137. Clearly placing and distributing these elements evenly across the surface would be extremely difficult and impossible for manufacture. Also note that the required time to heat the combined mass of the elements to 1400K from room temperature at 20 KW for elements with a radius of greater than 0.0002 meters is too large with respect to an overall cooking time of several seconds.

TABLE 2

| Wire Radius (m) | De Luca Element Ratio for single element (@ Room Temp) | Number of Parallel Elements Required to Achieve De Luca Ratio of 0.1137 | Total Weight/ Meter (g) | Time To Reach 1400 K At 20 kw (sec) From Room Temp |
|---|---|---|---|---|
| 0.01 | 0.1 | 1 | 2637 | 65.4 |
| 0.0015 | 16.2 | 12 | 711 | 17.6 |
| 0.001 | 47.7 | 22 | 579 | 14.4 |
| .0005 | 438 | 63 | 415 | 10.3 |
| 0.000191 | 9670 | 267 | 255 | 6.3 |
| 0.000127 | 30856 | 493 | 209 | 5.2 |
| 0.000022 | 5580486 | 6838 | 88 | 2.18 |

In summary, the following invention allows for the creation of a high power oven by using a resistive mesh element. The heater element designed so as to allow for the desired wavelength output by modifying both the thickness of the mesh as well as the surface area from which heat radiates. The heater consisting of a single unit mesh that is easily assembled into the oven and having a low mass so as to allow for a very quick heat-up (on the order of less than a few seconds).

Specifically, the wire mesh cloth design calibrated to have the correct De Luca Element Ratio for a fast response (less than 2 sec) oven application operating at 1400 degrees K.

According to exemplary embodiments, a mesh design for operating a quick response time oven consisting of a nichrome wire mesh with strand diameter of 0.3 mm, and spacing between strands of 0.3 mm, and operating voltage of 24V.

In considering the best mesh design, it is important to evaluate the blackbody radiative area as well as the resistance of the element as a function of the following:
1) The number of strands per unit area of the mesh
2) The radius of the mesh strands
3) The mesh strand material
4) The potential for radiation occlusion between strands.

A vapor generator including a wire mesh heater wherein the liquid to be heated is sprayed on wires forming the wire mesh is described. The liquid can, for example, flash vaporize or steam as it contacts the wires and steam can be continuously generated while the spray is maintained over the wire mesh. The liquid can be flash or instantly heated. In some embodiments, the present vapor generator can be disposed proximate or adjacent to a point of use or consumption.

Various embodiments that can generate various volumes of vapor can be provided. In some embodiments, multiple vapor generators can be disposed in series. In some embodiments, multiple vapor generators can be disposed in parallel conduits. In some embodiments, multiple sprayers can be used. In exemplary embodiments, the liquid may include water.

In some embodiments, the wire mesh heating element can comprise multiple wire mesh segments. Each wire mesh segment can be individually controlled for intensity and/or duration. This embodiment can provide the advantage of heating with a high flow rate. In addition, the heating profile for each wire mesh segment can be optimally customized. The customization can be achieved without reconfiguring the hardware of the vapor generator.

In some embodiments, a flow rate of the liquid being sprayed is maintained at a constant speed. As the liquid to be heated flows forward, the wire mesh heating element can heat the liquid. A wire mesh heating element either may be already on or may turn on when a flow is detected. In the absence of a liquid flow, the wire mesh heating element can be turned off. As it flows, the liquid is sprayed on to the wire mesh heating element and heated. In some embodiments, the spacing between the strands of wire forming the wire space can be covered. As such, when a wire mesh heating element is not porous the water flows along the surface of the wire mesh heating element.

In some embodiments, the wire mesh element includes a Ni-Chrome heating element.

In some embodiments, the wire mesh heater can be integrated or be formed as a unitary construction. The conduit can include industry standard male or female fittings. As such, the heater can be disposed in plumbing, for example, household plumbing.

The heater can include a leak proof nipple or fitting. Electrical leads connected to the wire mesh heating element can exit from the conduit from the leak proof nipple. In some embodiments, shielding to reflect infrared radiation can be provided on an inner surface of a heater in which a wire mesh heater is disposed.

The heater can include one or more temperature sensors. In some embodiments, the temperature sensor can be disposed downstream of the water mesh heater in a conduit conveying the vapor or steam. The temperature sensors can be disposed in a liquid drain. In exemplary embodiments, the temperature sensor can be an infrared sensor or a camera temperature sensor.

A controller that reads a temperature signal from a temperature sensor can be provided. The controller can limit the temperature and/or volume of the vapor, for example, by turning off and on the DC power supply, or an optional pump used to pump the liquid to be heated.

The heater can include a liquid flow sensor. The flow sensor can enable the DC power supply when a flow is present. In some embodiments, the flow sensor signal the controller whether a liquid flow is present or not.

The conduit can include a label indicating the direction of the liquid flow.

A low-voltage Direct Current (DC) power supply to energize the water-heating element can be provided. Exemplary low voltages include 6 Volts (V), 12 V, 18 V, 24 V, and the like. The DC power supply can be a high-amperage power supply. In some embodiments, the DC power supply can include stored energy device, such as, batteries to provide the necessary currents.

A vapor generator kit may include a sprayer, a wire mesh heating element and a DC power supply to be connected to the wire mesh heating element. The kit can include a heat insulator disposed on an outer surface of the heater. The kit can include a controller. The kit can include a flow sensor. The kit can include a temperature sensor.

Figure 1:
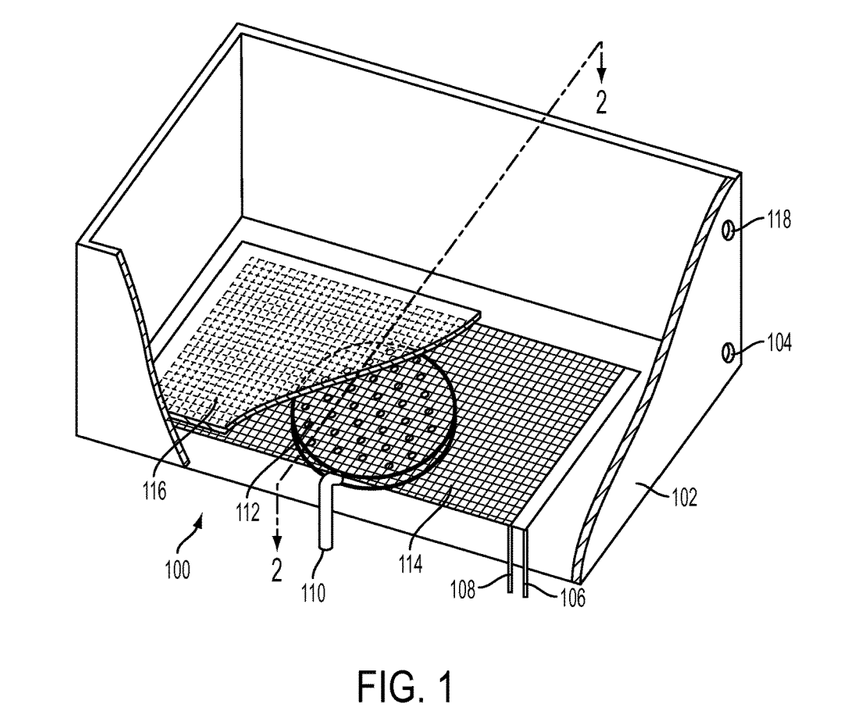
FIG. 1 illustrates a perspective view of a vapor generator including a wire mesh heating element according to exemplary embodiments.
Figure 2:
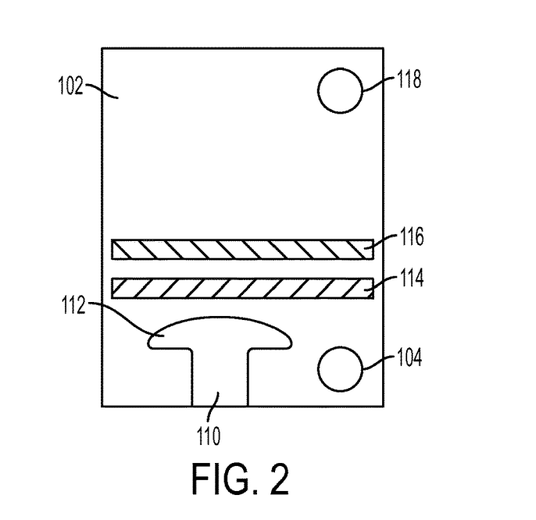
FIG. 2 illustrates a side view of a vapor generator including a wire mesh heating element according to exemplary embodiments.

FIG. 1 illustrates a perspective view of a vapor generator including a wire mesh heating element according to various embodiments. FIG. 2 illustrates a side view of a vapor generator including a wire mesh heating element according to various embodiments.

A vapor generator 100 can include a housing 102. The housing 102 can provide a liquid outlet 104, a vapor outlet 118 and a liquid inlet 110. The housing 102 can provide an inlet for wires 106 and 108 to deliver an electrical current to a wire mesh heating element 114. The wire mesh heating element 114 can be disposed in the housing 102. The liquid inlet 110 can be connected to a liquid sprayer 112. In some embodiments, a sprayer receiving surface 116 can be disposed adjacent to the wire mesh heating element 114 opposite the sprayer 112. In some embodiments, the sprayer receiving surface 116 can include a wall of the housing 102.

Wires 106 and 108 can be connected to the wire mesh element 114. Wire mesh heating element 114 can be secured within housing 102, for example, on a stand, legs, or the like. In exemplary embodiments, wires 106 and 108 may be flexible, may be integrated into a vessel, may include hinges are that squeeze together upon closing the cover to ensure proper conductivity along wires 106 and 108.

The housing 102 can be thermally insulated. The housing 102 can be a material that can withstand high temperatures.

The liquid outlet 104 can be a drain. The liquid outlet can be disposed below a spray outlet of the sprayer 110. The liquid outlet 104 can be disposed below the wire mesh heating element 114, and as such, the wire mesh heating element 110 is not submerged under the liquid being heated. The liquid outlet 104 can be connected to a one-way valve (not shown), which prevents a liquid from entering the housing 102 from the liquid outlet 104. The liquid outlet 104 can be connected to plumbing fixtures (not shown) as known in the art.

As seen in FIG. 2, the vapor outlet 118 can be disposed above the wire mesh element 114. The vapor outlet 118 can be connected to one or more of a pressure regulator (not shown), a one-way valve (not shown) or other plumbing equipment fixtures as known in the art.

The liquid inlet 110 can be connected to the sprayer 112. The sprayer 112 can atomize or convert the liquid into very fine particles or droplets. The atomized liquid spray can be directed to contact a planar face of the wire mesh heating element 114. The spray can be directed upwards and contact a downward facing surface of the wire mesh heating element 114 as shown in FIG. 1 and FIG. 2. In exemplary embodiments, the spray generated by the sprayer 112 can be directed downwards, laterally, or angled in order to contact one or more surfaces of the wire mesh heating element 114. The sprayer 112 can comprise multiple sprayers, with each sprayer directing its spray to a segment of the wire mesh heating element 114.

The wire mesh heating element 114 can be disposed as a plane. In exemplary embodiments, the wire mesh heating element 114 can be shaped as a partial or full polyhedral. Exemplary polyhedral shapes include cube, sphere, pyramid, cone, cylinder, and the like. The sprayer 112 including multiple sprayers can be disposed within the polyhedral shaped wire mesh heating element 114. In exemplary embodiments, sprayer 112 can include multiple sprayers that are disposed without or outside the polyhedral shaped wire mesh heating element 114. In exemplary embodiments, sprayer 112 can be disposed within and without the polyhedral shaped wire mesh heating element 114. In the various configurations, the multiple sprayers of the sprayer 112 can direct their respective spray to a surface of the polyhedral shaped wire mesh heating element 114. In exemplary embodiments, a surface of the polyhedral shaped wire mesh heating element 114 can be disposed between one or more sprayers included in sprayer 112 and a spray receiving surface 116.

In exemplary embodiments, the wire mesh heating element 114 can comprise multiple wire mesh heating segments disposed parallel to each other, and the sprayer 112 can direct its spray through multiple parallel wire mesh heating segments.

The spray receiving surface 116 can be made from a material capable of withstanding high temperatures, such as, metal, fiber glass, and the like.

FIG. 3 illustrates a system view of a vapor generator according to exemplary embodiments.

A liquid heating system 300 can include a vapor generator 302, a controller 304, a vapor outlet 306 and a liquid inlet 310. The liquid heating system 300 can optionally include one or more of a liquid outlet 308, a pump 312, a liquid filtration system 314 and a liquid supply 316. The controller 304 can receive a signal from a temperature sensor (not shown). The temperature sensor can be disposed downstream of the vapor generator 302, for example, near the vapor outlet 306. The temperature sensor can measure the temperature of the vapor or the liquid in the heated liquid. The controller 304 can include an input that can set the max temperature of the heated liquid. The input can, for example, include a dial, a knob, or any other input means known in the art. The controller 304 can sense a temperature signal from the temperature sensor and control the wire mesh heating element included in vapor generator 302 based on the max temperature input. In some embodiments, the controller 304 can enable an electrical connection between the wire mesh heating element of the vapor generator 302 and a Direct Current (DC) power supply (not shown) when the temperature is below a max temperature. In some embodiments, the controller 304 can disable an electrical connection between the wire mesh heating element of the vapor generator 302 and the power supply when the temperature is at or above a max temperature. In exemplary embodiments, power to the wire mesh heating element can be provided through elements that are located within the liquid medium.

Figure 3:
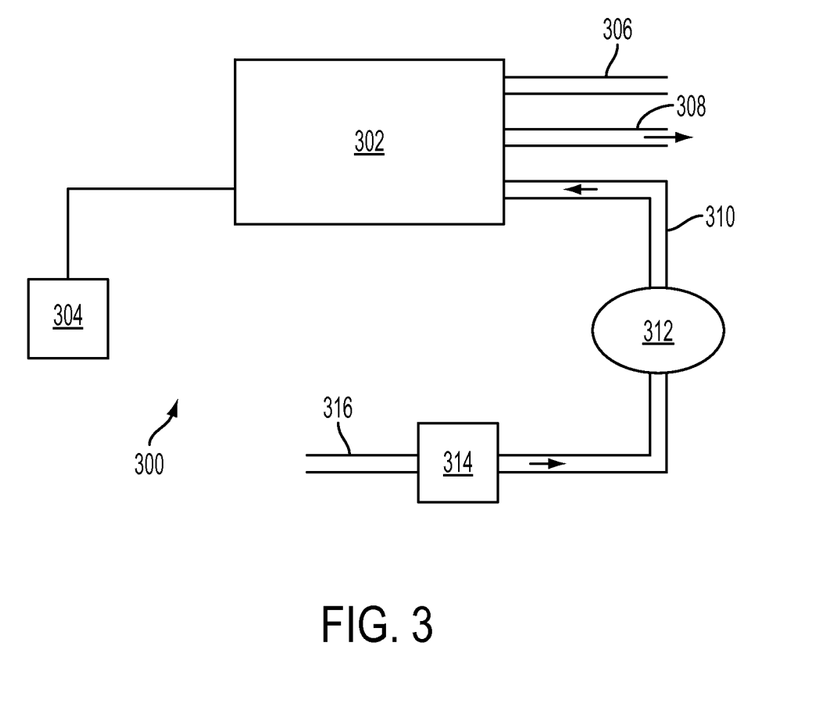
FIG. 3 illustrates a system view of a vapor generator according to exemplary embodiments.

A controller 304 can receive a signal from a flow sensor (not shown). Flow sensor can be disposed upstream of the vapor generator 302. The flow sensor can measure a flow of the liquid, for example, the unheated liquid entering the liquid input 310. The controller 302 can sense the signal from the flow sensor and control the vapor generator 302, by enabling an electrical connection to the power supply when a flow is sensed. In some embodiments, the controller 304 can disable an electrical connection between the power supply and wire mesh heating element of the vapor generator 302.

Figure 3A:
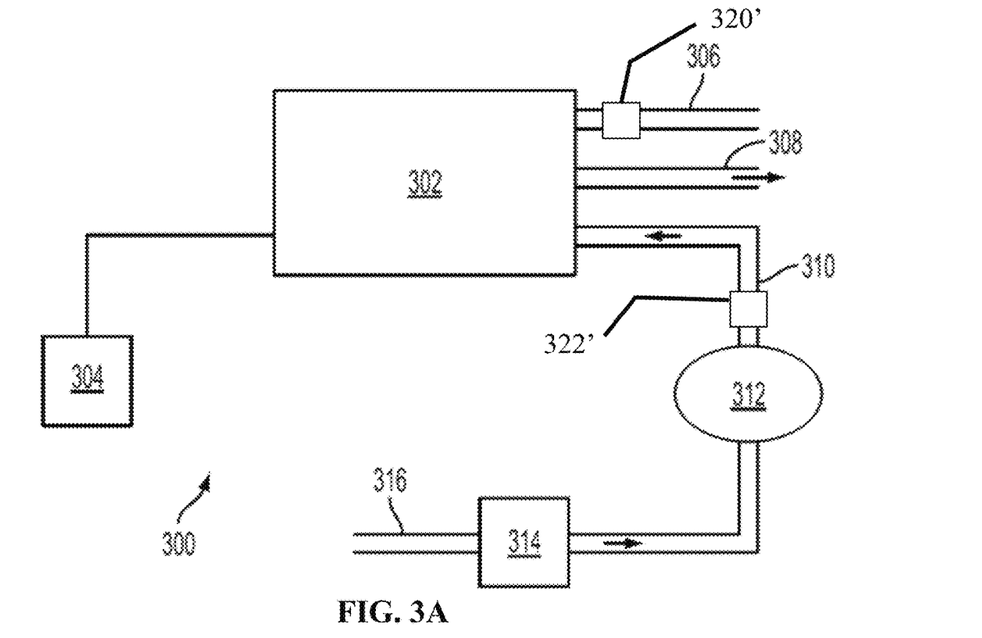
FIG. 3A illustrates a system view of a vapor generator according to exemplary embodiments.

FIG. 3A illustrates a system view of a vapor generator according to exemplary embodiments. The liquid heating system 300 may include a flow sensor 320' and a temperature sensor 322'.

Figure 3B:
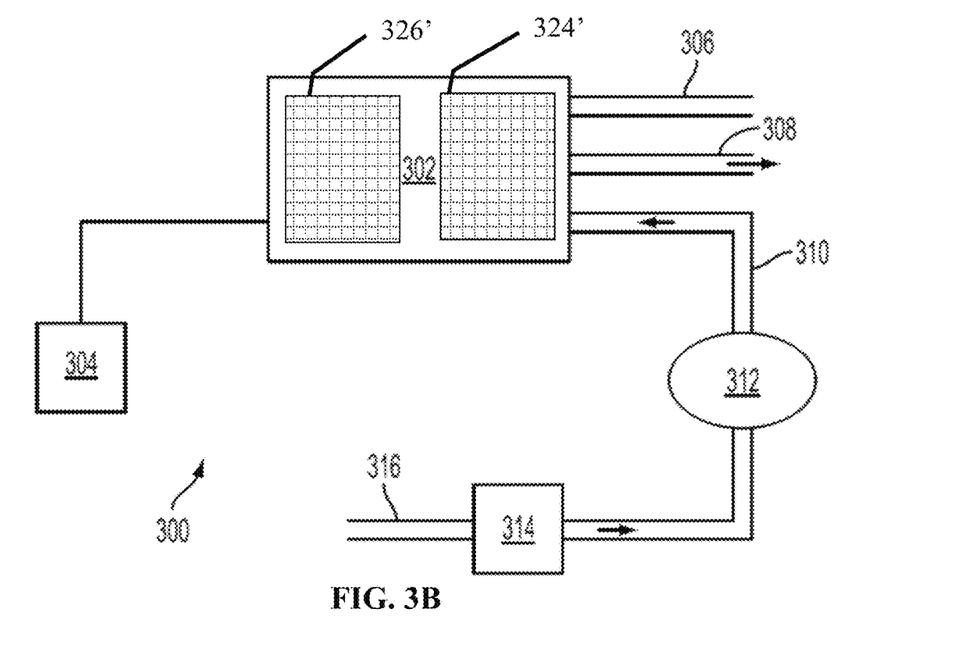
FIG. 3B illustrates a system view of a vapor generator according to exemplary embodiments.

FIG. 3B illustrates a system view of a vapor generator according to exemplary embodiments. The liquid heating system 300 may include a wire mesh heating element 324' and a wire mesh heating element 326'.

Figure 3C:
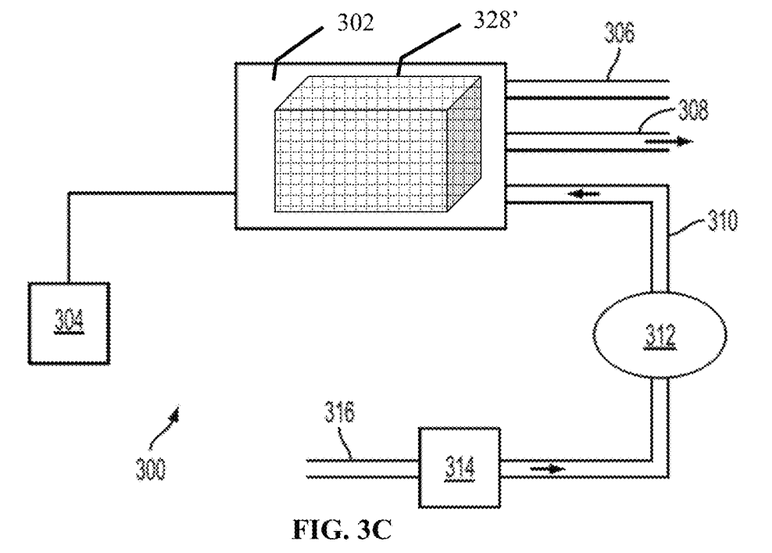
FIG. 3C illustrates a system view of a vapor generator according to exemplary embodiments.

FIG. 3C illustrates a system view of a vapor generator according to exemplary embodiments. The liquid heating system 300 may include a partial or full polyhedral wire mesh heating element 328'.

Figure 3D:
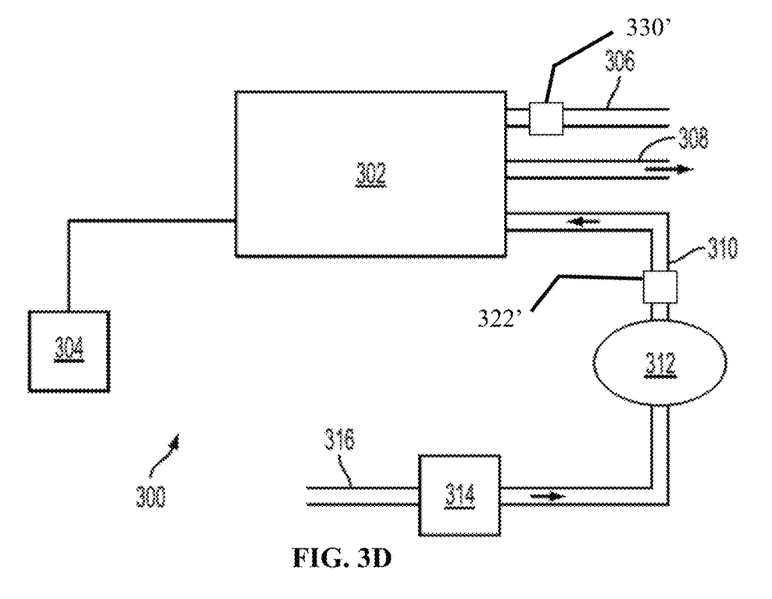
FIG. 3D illustrates a system view of a vapor generator according to exemplary embodiments.

FIG. 3D illustrates a system view of a vapor generator according to exemplary embodiments. The liquid heating system 300 may include a temperature sensor 322' and a pressure vessel 330'.

Figure 4:
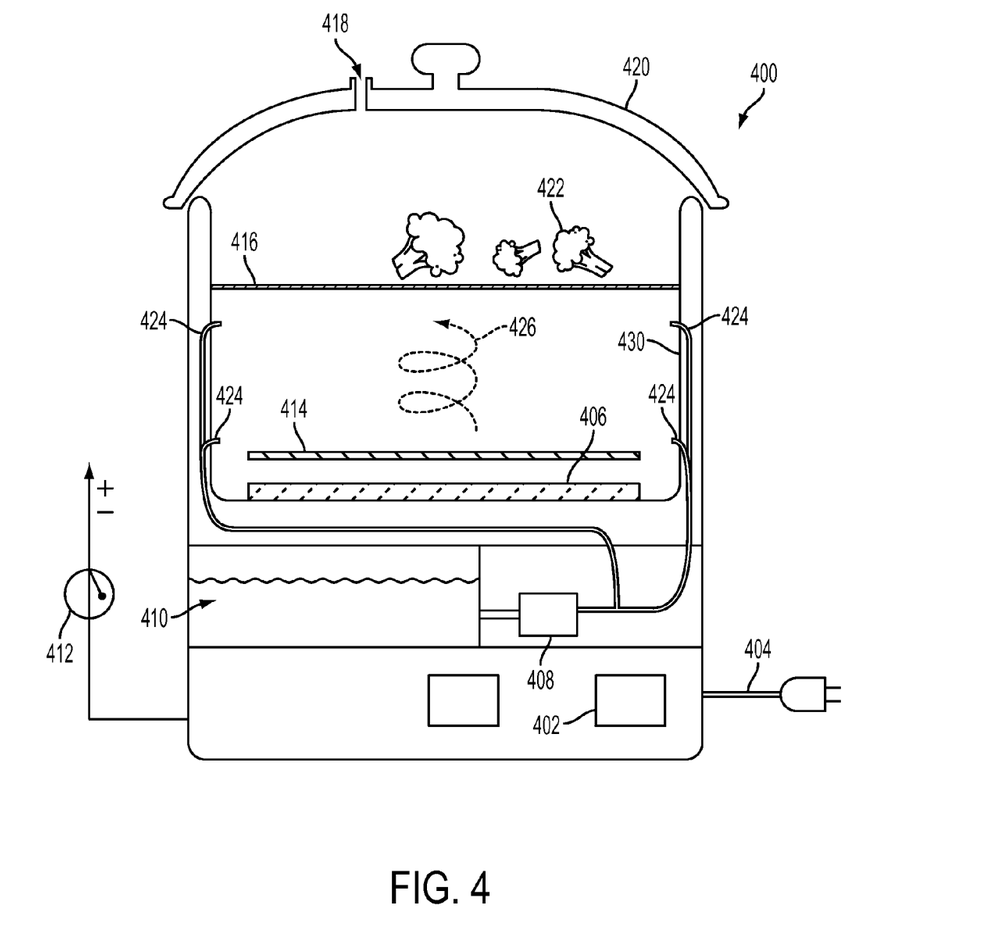
FIG. 4 illustrates a side view of a steam generator including a wire mesh heating element according to exemplary embodiments.

FIG. 4 illustrates a side view of a liquid steamer including a wire mesh heating element according to exemplary embodiments.

A water steamer 400 can include an energy storage device 402, a charger 404 to connect to an electrical power source, a water reservoir 410, and a pump 408 to pump the water from the water reservoir 410 via one or more sprayers 424 onto a wire mesh heating element 414 to generate steam 426. The compartment to store the energy storage device 402 can be disposed at a bottom of the steamer 400. The water reservoir 410 can be disposed at or near the bottom of the steamer 400. The steamer 400 can include a switch 412, for example, a programmable switch, to control power being supplied to the wire mesh heating element 414. The switch 412 can be operated by a user to control various settings, for example, a timer, a steam cycle, a keep warm cycle, or the like. The wire mesh heating element 414 can be disposed on a thermally insulative surface 406 disposed in a container 430. Exemplary materials to form the thermally insulative surface 406 include, for example, glass or fiberglass. The sprayer 424 can direct a fine spray, for example, an atomized spray, at the wire mesh heating element 414. The vapor 426 generated by operation of the steamer 400 may rise and passed through a perforated tray 416, for example, a steel tray, to heat, cook or the like, a load 422. The load 422 can comprise food items both liquid or solid. The container 430 included in the steamer 400 can be closed a cover 420. In exemplary embodiments the cover 420 can include a vent 418. The vent 418 can regulate pressure of the steam 426.

According to exemplary embodiments of steamer as described herein can be used as a coffee maker, a pasta maker, to heat other foods, to distill liquids such as water or the like. According to exemplary embodiments, the steamer can be scaled to its application, for example, use in a household steamer, sanitizing machine, an industrial scale steamer, or the like.

Figure 5:
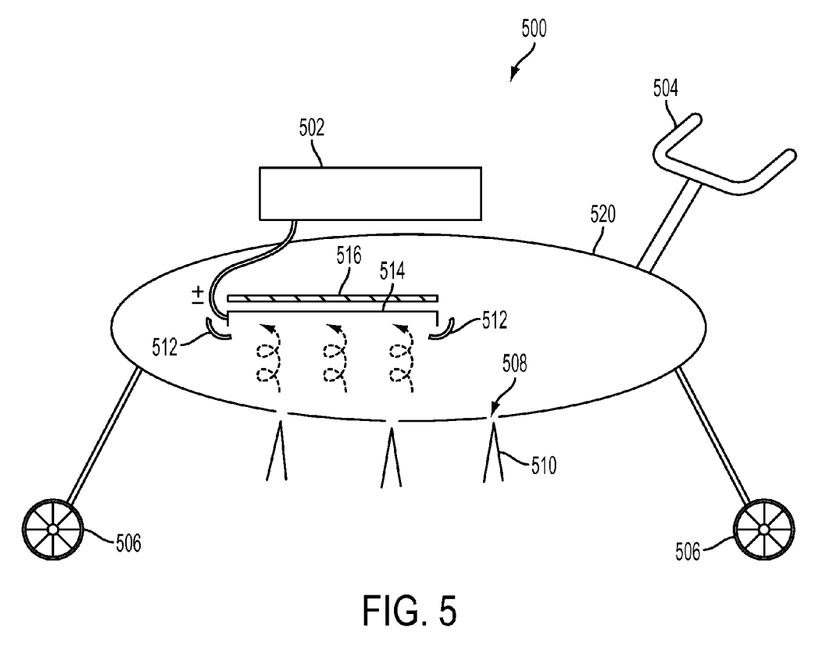
FIG. 5 illustrates a functional view of a steam floor sanitizer including a wire mesh heating element according to exemplary embodiments.

FIG. 5 illustrates a functional view of a steam floor sanitizer including a wire mesh heating element according to exemplary embodiments. Steamer 500 can include a housing 520, stored energy device 502, a water reservoir (not shown), a pump (not shown), and a wire mesh heating element 514. A sprayer 512 can direct water from the pump as a fine spray onto the wire mesh heating element 514. The wire mesh heating element 514 can be disposed between the prayer 512 and a thermally insulative surface 516. The thermally insulative surface 516 can form a spray receiving surface. The body 520 of the steamer 500 can include one or more handles 504 to propel the steamer 500 on wheels 506 steam generated using the wire mesh heating element 514 can exit the body 520 of the steamer 500 via one or more outlet holes 508 to produce steam 510.

The present disclosure allows for the creation of a high power vapor generator by using a resistive wire mesh element. The heater element can allow for a desired wavelength output by modifying both the thickness of the mesh as well as the surface area from which heat radiates. The heater includes a mesh that is assembled into a liquid/water heater and having a low mass so as to allow for a very quick heat-up (on the order of less than a few seconds).

Wire mesh heating element can include horizontal and vertical wires crisscrossing one another. The nodal intersections of the wires can form an electrical short. The wire mesh need not be electrically insulated. In some embodiments, the wire mesh includes an electrical insulator disposed thereupon. The wire mesh wire can include Nichrome. In exemplary embodiments, the wire mesh may be formed by perforating a sheet with holes.

In some embodiments, the wire mesh can include a hydrophobic coating in order to facilitate movement of heated water away from the wire mesh. A mesh design for operating a quick response time vapor generator can include of a nichrome wire mesh with strand diameter of 0.3 mm, and spacing between strands of 0.3 mm, and operating voltage of 24V. In some embodiments, the wire mesh can have a strand diameter of, for example, less than 1.5 mm, 1 mm, less than 0.7 mm, less than 0.5, less than 0.3 mm, less than 0.1 mm, or the like. In some embodiments, the spacing between strands can have a length of, for example, less than 1.5 mm, 1 mm, less than 0.7 mm, less than 0.5, less than 0.3 mm, less than 0.1 mm, or the like.

The wire mesh can include a wire mesh cloth that is, for example, calibrated for a fast response heating application operating. For example, the wire mesh can operate at 1400 degrees K or greater. In some embodiments, the wire mesh can attain a high temperature in, for example, less than 10 seconds, in less than 5 seconds, in less 2 seconds or the like.

The DC power supply can operate at, for example, 48V or less, 24 V or less, 12 V or less, 6 V or less, or the like.

A length L of the wire mesh can be, for example, less than 200 mm, less than 150 mm, less than 100 mm, less than 50 mm, or the like.

The examples presented herein are intended to illustrate potential and specific implementations. It can be appreciated that the examples are intended primarily for purposes of illustration for those skilled in the art. The diagrams depicted herein are provided by way of example. There can be variations to these diagrams or the operations described herein without departing from the spirit of the invention. For instance, in certain cases, method steps or operations can be performed in differing order, or operations can be added, deleted or modified.

What is claimed is:

1. A vapor generator comprising:
   a circuit to carry a DC current from an energy device;
   a wire mesh heating element to receive the DC current; and
   a sprayer to direct a fine spray of a liquid at the wire mesh heating element to vaporize the liquid,
   wherein a ratio of a resistance of the wire mesh heating element to a radiative black body area of the wire mesh heating element is less than 2 ohms/m².

2. The vapor generator of claim 1, wherein the DC current is supplied by a voltage source having a potential less than 24 Volts.

3. The vapor generator of claim 1, wherein the wire mesh heating element comprises multiple wire mesh segments disposed in a housing.

4. The vapor generator of claim 3, further comprising a relay for cycling the current connection to each of the multiple wire mesh segments, and a control circuit for controlling each of the relays.

5. The vapor generator of claim 3, further comprising:
   a control circuit for controlling current to each of the multiple wire mesh segments by cycling on and off at a duty ratio in response to a user input or to a measured parameter indicating a presence of the vaporized liquid.

6. The vapor generator of claim 3, further comprising a voltage control circuit to vary the voltage of each of the multiple wire mesh segments.

7. The vapor generator of claim 3, wherein the multiple wire mesh segments are electrically connected to a DC power supply using a parallel circuit.

8. The vapor generator of claim 1, further comprising:
   a temperature sensor to generate a liquid temperature signal; and
   a controller to sense the liquid temperature signal, and to enable the circuit for carrying the DC current when the liquid temperature signal indicates a temperature less than a desired temperature.

9. The vapor generator of claim 1, further comprising:
   a flow sensor to generate a liquid flowing signal; and
   a controller to sense the liquid flowing signal, and to enable the circuit for carrying the DC current when the liquid flowing signal indicates a liquid flow.

10. The vapor generator of claim 1, wherein the wire mesh heating element comprises a wire mesh cloth comprising wire strands having a diameter less than 0.5 mm and a spacing between the wire strands of less than 0.5 mm.

11. The vapor generator of claim 10, wherein the wire strands crisscross and form an electrical short at an intersection.

12. The vapor generator of claim 1, further comprising a hydrophobic coating disposed on the wire mesh heating element.

13. The vapor generator of claim 1, wherein the wire mesh heating element is capable of reaching about 1400° Kelvin from room temperature in less than 10.3 seconds.

14. The vapor generator of claim 1, wherein the wire mesh heating element is shaped as a partial or full polyhedral.

15. The vapor generator of claim 14, wherein the sprayer comprises multiple sprayers and at least one of the multiple sprayers directs its spray at at least one surface of the partial or full polyhedral wire mesh heating element.

16. The vapor generator of claim 1, further comprising a pressure vessel comprising an inlet to receive the vapor and a pressure regulator.

17. A vapor generator comprising:
   a circuit to carry a DC current;
   a wire mesh heating element to receive the DC current, wherein the wire mesh heating element comprises wires and one or more nodal intersections of the wires forming an electrical short;
   a sprayer to direct a fine spray of a liquid at the wire mesh heating element to vaporize the liquid; and
   a spray receiving surface disposed adjacent to the wire mesh heating element,
   wherein the wire mesh heating element is disposed between the sprayer and the spray receiving surface.

18. The vapor generator of claim 17, wherein the spray receiving surface comprises fiber glass.

19. The vapor generator of claim 17, wherein the spray receiving surface is hydrophobic.

20. The vapor generator of claim 17, wherein the spray receiving surface comprises electrical insulation.

21. The vapor generator of claim 17, wherein an average distance between the wire mesh heating element and the spray receiving surface is 2 mm or less.

22. The vapor generator of claim 17, wherein one or more of the wire mesh heating element or the spray receiving surface are movable with respect to each other.

23. A vapor generator kit comprising:
   a DC power supply;
   a wire mesh heating element to receive a DC current from the DC power supply, wherein the wire mesh heating element comprises wires and one or more nodal intersections of the wires forming an electrical short;
   a sprayer configured to direct a fine spray of a liquid at the wire mesh heating element to vaporize the liquid; and
   a spray receiving surface to be disposed adjacent to the wire mesh heating element,
   wherein the wire mesh heating element is to be disposed between the sprayer and the spray receiving surface.

24. The vapor generator kit of claim 23, further comprising a housing, wherein the wire mesh element is disposed in the housing.

25. The vapor generator kit of claim 23, further comprising
   a temperature sensor to generate a liquid temperature signal; and
   a controller to sense the liquid temperature signal, and to enable the circuit for carrying the DC current when the liquid temperature signal indicates a temperature less than a desired temperature.

* * * * *